(12) United States Patent
Xu et al.

(10) Patent No.: US 12,046,762 B1
(45) Date of Patent: Jul. 23, 2024

(54) END COVER ASSEMBLY, ENERGY-STORAGE DEVICE, AND ELECTRICITY-CONSUMPTION DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Weidong Xu, Guangdong (CN); Yongfeng Xiong, Guangdong (CN); Jinqiang Chen, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/539,938

(22) Filed: Dec. 14, 2023

(30) Foreign Application Priority Data

Feb. 9, 2023 (CN) .......................... 202310091044.9

(51) Int. Cl.
*H01M 50/15* (2021.01)
*H01M 50/184* (2021.01)
(Continued)

(52) U.S. Cl.
CPC ......... *H01M 50/15* (2021.01); *H01M 50/184* (2021.01); *H01M 50/186* (2021.01); *H01M 50/553* (2021.01)

(58) Field of Classification Search
CPC .. H01M 50/15; H01M 50/184; H01M 50/186; H01M 50/553
See application file for complete search history.

(56) References Cited

U.S. PATENT DOCUMENTS

| 2010/0279156 A1 | 11/2010 | Kim et al. |
| 2012/0308877 A1 | 12/2012 | Hirai |
| (Continued) | | |

FOREIGN PATENT DOCUMENTS

| CA | 2983520 A1 | 1/2019 |
| CN | 1608176 A | 4/2005 |
| (Continued) | | |

OTHER PUBLICATIONS

CNIPA, First Office Action for corresponding Chinese Patent Application No. 202310091044.9, May 6, 2023, 32 pages.
(Continued)

*Primary Examiner* — Matthew T Martin
*Assistant Examiner* — Bartholomew A Hornsby
(74) *Attorney, Agent, or Firm* — IP Spring (57) ABSTRACT

Disclosed are an end cover assembly, an energy-storage device, and an electricity-consumption device. The end cover assembly includes an isolation member. A main body of the isolation member has a first surface and a second surface opposite the first surface, and the isolation member defines a through hole penetrating through both the first surface and the second surface. Each first protrusion portion on the first surface and each second protrusion portion on the second surface are spaced apart from the through hole. A conductive block defines multiple first blind holes and an assembly hole, and each first blind hole fits one first protrusion portion. A top cover defines multiple second blind holes and a mounting hole, and each second blind hole fits one second protrusion portion. A post body of the terminal post passes through the mounting hole, the through hole, and the assembly hole sequentially.

19 Claims, 4 Drawing Sheets

(51) Int. Cl.
*H01M 50/186* (2021.01)
*H01M 50/553* (2021.01)

(56) References Cited

U.S. PATENT DOCUMENTS

| | | | |
|---|---|---|---|
| 2021/0043912 A1 | 2/2021 | Zhu et al. | |
| 2022/0045392 A1 | 2/2022 | Chen et al. | |
| 2022/0393275 A1* | 12/2022 | Xu | H01M 50/103 |
| 2023/0032938 A1* | 2/2023 | Jiang | H01M 50/176 |

FOREIGN PATENT DOCUMENTS

| | | | |
|---|---|---|---|
| CN | 102748347 A | 10/2012 | |
| CN | 206397884 U | 8/2017 | |
| CN | 207183329 U | 4/2018 | |
| CN | 207338516 U | 5/2018 | |
| CN | 109546018 A | 3/2019 | |
| CN | 111785864 A | 10/2020 | |
| CN | 213692205 U | 7/2021 | |
| CN | 113488730 A | 10/2021 | |
| CN | 113488731 A | 10/2021 | |
| CN | 113906225 A | 1/2022 | |
| CN | 215816083 U | 2/2022 | |
| CN | 216120511 U | 3/2022 | |
| CN | 216389541 U | 4/2022 | |
| CN | 114927812 A | 8/2022 | |
| CN | 115461929 A | 12/2022 | |
| CN | 115621667 A | 1/2023 | |
| WO | 2022085991 A1 | 4/2022 | |
| WO | 2022217884 A1 | 10/2022 | |

OTHER PUBLICATIONS

CNIPA, Notice to Grant Patent Right for Invention for corresponding Chinese Patent Application No. 202310091044.9, May 25, 2023, 6 pages.

WIPO, International Search Report and Written Opinion for International Patent Application No. PCT/CN2023/075261, Sep. 8, 2023, 18 pages.

* cited by examiner

FIG. 8

END COVER ASSEMBLY, ENERGY-STORAGE DEVICE, AND ELECTRICITY-CONSUMPTION DEVICE

CROSS-REFERENCE TO RELATED APPLICATIONS

This application claims priority under 35 U.S.C. § 119(a) to Chinese Patent Application No. 202310091044.9, filed Feb. 9, 2023, the entire disclosure of which is incorporated herein by reference.

TECHNICAL FIELD

This disclosure relates to the technical field of energy-storage devices, and in particular to an end cover assembly, an energy-storage device, and an electricity-consumption device.

BACKGROUND

An energy-storage device (for example, a secondary battery) may include a housing, an end cover assembly, and a jelly roll inside the housing. The end cover assembly may include an isolation sheet, a top cover, a conductive block, and a terminal post. The isolation sheet may be a sheet-like member with a through hole defined at the middle of the isolation sheet. Dimensions of mass-produced components such as the isolation sheet may have an error range, and the through hole at the middle of the isolation sheet may be generally bigger than the terminal post. In the subsequent assembly process, there may be a gap between the terminal post and the isolation sheet after the terminal post is inserted into the through hole of the isolation sheet, and thus the isolation sheet may be prone to dislocation. In this case, manual adjustment may be needed, resulting in extremely low assembly efficiency, thereby increasing the cost of the secondary battery.

SUMMARY

An end cover assembly, an energy-storage device, and an electricity-consumption device are provided in the present disclosure.

In a first aspect, an end cover assembly is provided in the present disclosure. The end cover assembly is applicable to an energy-storage device. The end cover assembly includes an isolation member, multiple first protrusion portions, multiple second protrusion portions, a conductive block, a top cover, and a terminal post. A main body of the isolation member has a first surface and a second surface opposite the first surface, and the isolation member defines a through hole penetrating through both the first surface and the second surface. Each of the multiple first protrusion portions is positioned on the first surface, spaced apart from the through hole, and provided with at least one first elongated protrusion on an outer peripheral wall of each of the multiple first protrusion portions. Each of the first protrusion portions is cylindrical, and the at least one first elongated protrusion extends, along an axis of the first protrusion portion, from the first surface to a position of the first protrusion portion that is below a surface of the first protrusion portion away from the first surface, and has a chamfered end close to the surface of the first protrusion portion away from the first surface. Each of the multiple second protrusion portions is positioned on the second surface, spaced apart from the through hole, and provided with at least one second elongated protrusion on an outer peripheral wall of each of the multiple second protrusion portion. Each of the plurality of second protrusion portions is cylindrical, and the at least one second elongated protrusion extends, along an axis of the second protrusion portion, from the second surface to a position of the second protrusion portion that is below a surface of the second protrusion portion away from the second surface, and has a chamfered end close to the surface of the second protrusion portion away from the second surface. The conductive block defines multiple first blind holes on a surface of the conductive block close to the first surface and an assembly hole, and each of the multiple first blind holes fits one of the multiple first protrusion portions. The top cover defines multiple second blind holes on a surface of the top cover close to the second surface and a mounting hole, and each of the multiple second blind holes fits one of the multiple second protrusion portions. The terminal post includes a post body. The post body passes through the mounting hole, the through hole, and the assembly hole sequentially, and is fixedly connected to a surface of the conductive block away from the first surface. Each of the multiple first protrusion portions is inserted into one of the multiple first blind holes, and each of the multiple second protrusion portions is inserted into one of the multiple second blind holes.

In a second aspect, an energy-storage device is provided in the present disclosure. The energy-storage device includes a housing and the end cover assembly of the first aspect. The end cover assembly is mounted at a top side of the housing.

In a third aspect, an electricity-consumption device is provided in the present disclosure. The electricity-consumption device includes the energy-storage device of the second aspect, and the energy-storage device is configured to power the electricity-consumption device.

BRIEF DESCRIPTION OF THE DRAWINGS

In order to describe technical solutions in embodiments of the present disclosure more clearly, the following will give a brief introduction to the accompanying drawings for describing embodiments.

Reference signs: 100—energy-storage device, 10—end cover assembly, 11—isolation member, 111—main body, 113—first surface, 115—second surface, 117—through hole, 118—first notch, 119—second notch, 12—first protrusion portion, 121—first elongated protrusion, 13—second protrusion portion, 131—second elongated protrusion, 15—conductive block, 151—assembly hole, 153—first blind hole, 17—top cover, 171—mounting hole, 173—second blind hole, 19—terminal post, 191—post body, 193—flange portion, 20—electrode assembly, 30—housing, 31—opening.

DETAILED DESCRIPTION

The following clearly and completely describes technical solutions of embodiments of the present disclosure with reference to the accompanying drawings. Embodiments described herein are merely some of, rather than all the embodiments of the present disclosure. Based on the embodiments of the present disclosure, all other embodiments obtained by those of ordinary skill in the art shall fall in the scope of protection of the present disclosure.

The following embodiments are illustrated with reference to the accompanying drawings to illustrate specific embodiments that can be implemented in the present disclosure. Directional terms such as "on", "upper", "under", "below", "beneath", "front", "back", "left", "right", "in", "inside", "out", "outside", "side", and the like in the present disclosure, only refer to the directions in the accompanying drawings. Therefore, directional terms are only used to better and clearly illustrate and understand the present disclosure, rather than explicitly or implicitly indicate that apparatuses or components referred to herein must have a certain orientation or be configured or operated in a certain orientation, and therefore the directional terms used herein cannot be understood as limitation to the present disclosure.

In addition, serial numbers assigned to components herein, such as "first", "second", or the like, are only used to distinguish described objects and elements, rather than describing a particular order or technical feature. The terms "connection" and "coupling" in the present disclosure include direct connection (coupling) and indirect connection (coupling) unless stated otherwise.

Figure 1:
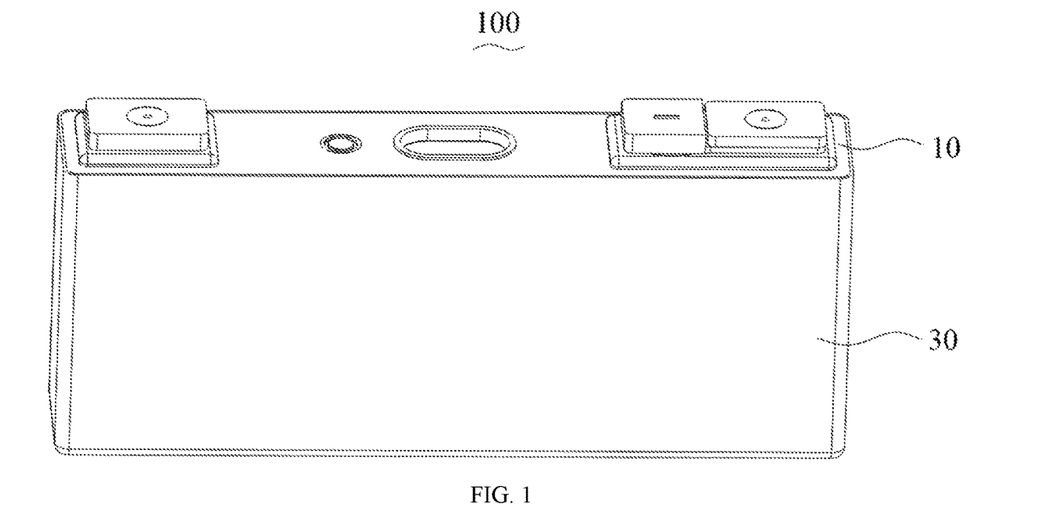
FIG. 1 is a schematic perspective structural view of an energy-storage device provided in embodiments of the present disclosure.
Figure 2:
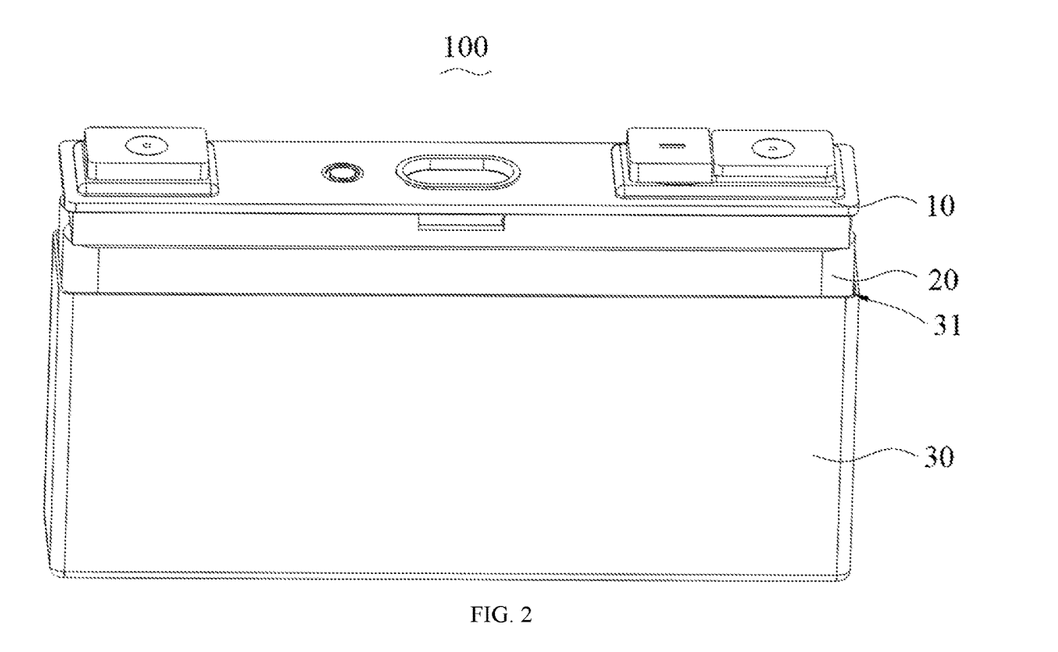
FIG. 2 is an exploded schematic perspective structural view of an energy-storage device provided in embodiments of the present disclosure.
Figure 3:
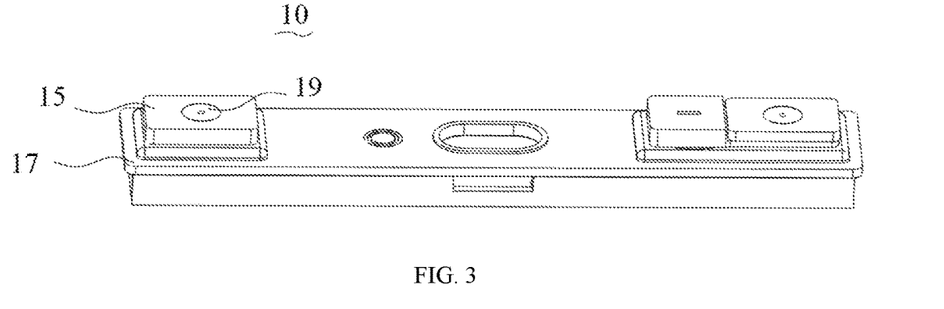
FIG. 3 is a schematic perspective structural view of an end cover assembly provided in embodiments of the present disclosure.

As illustrated in FIG. 1, FIG. 2, and FIG. 3, an energy-storage device 100 is provided in the present disclosure. The energy-storage device 100 includes a housing 30 and an end cover assembly 10 provided in embodiments of the present disclosure. The end cover assembly 10 is mounted at a top side of the housing 30. As illustrated in FIG. 4, FIG. 5, FIG. 6, and FIG. 7, the end cover assembly 10 provided in embodiments of the present disclosure includes an isolation member 11, multiple first protrusion portions 12, multiple second protrusion portions 13, a conductive block 15, a top cover 17, and a terminal post 19. A main body 111 of the isolation member 11 has a first surface 113 and a second surface 115 opposite the first surface 113, and the isolation member 11 defines a through hole 117 penetrating through both the first surface 113 and the second surface 115. Each of the multiple first protrusion portions 12 is positioned on the first surface 113, spaced apart from the through hole 117, and provided with at least one first elongated protrusion 121 on an outer peripheral wall of each of the multiple first protrusion portions 12. Each of the multiple second protrusion portions 13 is positioned on the second surface 115, spaced apart from the through hole 117, and provided with at least one second elongated protrusion 131 on an outer peripheral wall of each of the multiple second protrusion portion 13. The conductive block 15 defines an assembly hole 151. The conductive block 15 further defines multiple first blind holes 153 on a surface of the conductive block 15 close to the first surface 113, and each of the multiple first blind holes 153 fits one of the multiple first protrusion portions 12. The top cover 17 defines a mounting hole 171. The top cover 17 further defines multiple second blind holes 173 on a surface of the top cover 17 close to the second surface 115, and each of the multiple second blind holes 173 fits one of the multiple second protrusion portions 13. The terminal post 19 includes a post body 191. The post body 191 passes through the mounting hole 171, the through hole 117, and the assembly hole 151 sequentially, and is fixedly connected to a surface of the conductive block 15 away from the first surface 113. Each of the multiple first protrusion portions 12 is inserted into one of the multiple first blind holes 153, and each of the multiple second protrusion portions 13 is inserted into one of the multiple second blind holes 173.

In the end cover assembly 10 and the energy-storage device 100 in the present disclosure, the isolation member 11 is provided with the multiple first protrusion portions 12 on the first surface 113 of the isolation member 11, each first protrusion portion 12 is provided with at least one first elongated protrusion 121 on the outer peripheral wall of each first protrusion portion 12, the conductive block 15 defines the multiple first blind holes 153 on the surface of the conductive block 15 facing the first surface 113, and each first blind hole 153 corresponds to and fits one first protrusion portion 12. During assembling the isolation member 11 with the conductive block 15, with aid of the guidance of the first elongated protrusion 121 on the outer peripheral wall of the first protrusion portion 12, it may be easy to align the first protrusion portion 12 with and insert the first protrusion portion 12 into a corresponding first blind hole 153 on the conductive block 15, thereby improving the efficiency of assembling the isolation member 11 with the conductive block 15. Each first blind hole 153 fits one first protrusion portion 12, and the first elongated protrusion 121 on the outer peripheral wall of each first protrusion portion 12 may efficiently prevent rotation of the isolation member 11 relative to the conductive block 15. The isolation member 11 is provided with the multiple second protrusion portions 13 on the second surface 13 of the isolation member 11, and each second protrusion portion 13 is provided with at least one second elongated protrusion 131 on the outer peripheral wall of each second protrusion portion 13. The top cover 17 defines the multiple second blind holes 173 on the surface of the top cover 17 facing the second surface 115, and each second blind hole 173 corresponds to and fits one second protrusion portion 13. During assembling the isolation member 11 with the top cover 17, with aid of the guidance of the second elongated protrusion 131 on the outer peripheral wall of the second protrusion portion 13, it may be easy to align the second protrusion portion 13 with and insert the second protrusion portion 13 into a corresponding second blind hole 173 on the top cover 17, thereby improving the efficiency of assembling the isolation member 11 with the top cover 17. Each second blind hole 173 fits one second protrusion portion 13, and the second elongated protrusion 131 on the outer peripheral wall of each second protrusion portion 13 may efficiently prevent rotation of the isolation member 11 relative to the top cover 17. The isolation member 11 is sandwiched between the top cover 17 and the conductive block 15, each first protrusion portion 12 on the first surface 113 fits one first blind hole 153 on the conductive block 15 to limit the position of the first protrusion portion 12, and each second protrusion portion 13 on the second surface 115 fits one second blind hole 173 on the top cover 17 to limit the position of the second protrusion portion 13. In this way, the isolation member 11 can be positioned to avoid dislocation, and rotation of the conductive block 15 relative to the top cover 17 can be avoided, such that torsion-withstanding of the energy-storage device 100 can be improved, and the energy-storage device 100 can be protected from damage during subsequent module assembly of the energy-storage device 100.

It may be noted that the multiple first protrusion portions 12 are the same in shape and structure, the multiple second protrusion portions 13 are the same in shape and structure, the multiple first blind holes 153 are the same in shape and structure, and the multiple second blind holes 173 are the same in shape and structure. It may be further noted that the first protrusion portion 12 and the second protrusion portion 13 may be the same in structure and shape, and the first blind hole 153 and the second blind hole 173 may be the same in structure and shape. Each first blind hole 153 has at least one portion each fitting one of the at least one first elongated protrusion 121, such that the first elongated protrusion 121 can be inserted into the first blind hole 153 to prevent rotation of the isolation member 11. Each second blind hole 173 has at least one portion each fitting one of the at least one second elongated protrusion 131, such that the second elongated protrusion 131 can be inserted into the second blind hole 173 to prevent rotation of the isolation member 11.

It may be understood that the energy-storage device 100 may include, but is not limited to, a battery, a battery module, a battery pack, a battery system, a battery cabinet, a containerized energy-storage device, or the like. In the case where the energy-storage device 100 is a battery, the energy-storage device 100 may be a prismatic battery or a cylindrical battery.

As illustrated in FIG. 2, the energy-storage device 100 may further include an electrode assembly 20 accommodated in the housing 30. The housing 30 defines an opening 31, and the end cover assembly 10 is mounted at a side of the housing 30 where the opening 31 is positioned to cover the opening 31 of the housing 30.

As illustrated in FIG. 5, FIG. 6, FIG. 7, and FIG. 8, in a possible embodiment, a ratio of a height H1 at which the first protrusion portion 12 protrudes in a height direction from the main body 111 of the isolation member 11 (i.e., the height H1 of the first protrusion 12) to a depth D1 of the first blind hole 153 satisfies H1:D1=0.45-0.95, and a ratio of a height H2 at which the second protrusion portion 13 protrudes in the height direction from the main body 111 of the isolation member 11 (i.e., the height H2 of the second protrusion 13) to a depth D2 of the second blind hole 173 satisfies H2:D2=0.45-0.95.

It can be seen that, the depth D1 of the first blind hole 153 is greater than the height H1 of the first protrusion portion 12. In this case, during assembling the first protrusion portion 12 into a corresponding first blind hole 153, the first protrusion portion 12 can be fully inserted into the corresponding first blind hole 153, and thus it can be ensured that warping of the isolation member 11 can be avoided during assembling the isolation member 11 with the conductive block 15. When the ratio of the height H1 of the first protrusion portion 12 to the depth D1 of the first blind hole 153 is less than 0.45, the first protrusion portion 12 inserted into the first blind hole 153 occupies a small part of the first blind hole 153, resulting in poor stability of the connection between the first protrusion portion 12 and the first blind hole 153. When the ratio of the height H1 of the first protrusion portion 12 to the depth D1 of the first blind hole 153 is greater than 0.95, the first protrusion portion 12 cannot be fully inserted into the first blind hole 153, and thus the first protrusion portion 12 is prone to warping. In the present disclosure, the ratio of the height H1 of the first protrusion portion 12 to the depth D1 of the first blind hole 153 satisfies H1:D1=0.45-0.95, such that the stability of the connection between the isolation member 11 and the conductive block 15 can meet the requirement, and warping of the isolation member 11 can be avoided during assembling the isolation member 11 with the conductive block 15. Similarly, the depth D2 of the second blind hole 173 is greater than the height H2 of the second protrusion portion 13. In this case, during assembling the second protrusion portion 13 into a corresponding second blind hole 173, the second protrusion portion 13 can be fully inserted into the corresponding second blind hole 173, and thus it can be ensured that warping of the isolation member 11 can be avoided during assembling the isolation member 11 with the top cover 17. When the ratio of the height H2 of the second protrusion portion 13 to the depth D2 of the second blind hole 173 is less than 0.45, the second protrusion portion 13 inserted into the second blind hole 173 occupies a small part of the second blind hole 173, resulting in poor stability of the connection between the second protrusion portion 13 and the second blind hole 173. When the ratio of the height H2 of the second protrusion portion 13 to the depth D2 of the second blind hole 173 is greater than 0.95, the second protrusion portion 13 cannot be fully inserted into the second blind hole 173, and thus the second protrusion portion 13 is prone to warping. In the present disclosure, the ratio of the height H2 of the second protrusion portion 13 to the depth D2 of the second blind hole 173 satisfies H2:D2=0.45-0.95, such that the stability of the connection between the isolation member 11 and the top cover 17 can meet the requirement, and warping of the isolation member 11 can be avoided during assembling the isolation member 11 with the top cover 17. It may be understood that the ratio of the height H1 of the first protrusion portion 12 to the depth D1 of the first blind hole 153 may be equal to or not equal to the ratio of the height H2 of the second protrusion portion 13 to the depth D2 of the second blind hole 173, which is not limited in the present disclosure.

Figure 5:
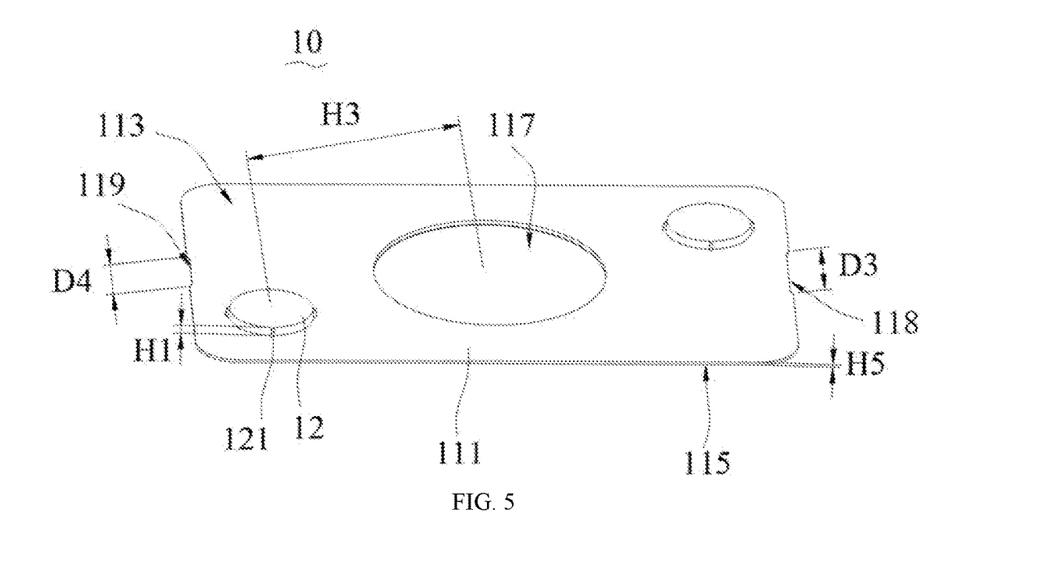
FIG. 5 is a schematic perspective structural view of an isolation member in an end cover assembly provided in embodiments of the present disclosure.
Figure 6:
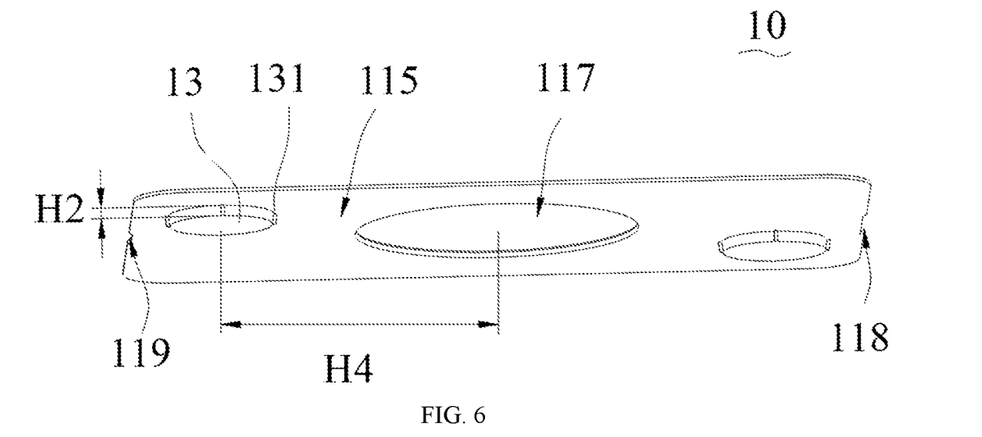
FIG. 6 is a schematic perspective structural view of a conductive block in an end cover assembly provided in embodiments of the present disclosure, viewed from one direction.
Figure 7:
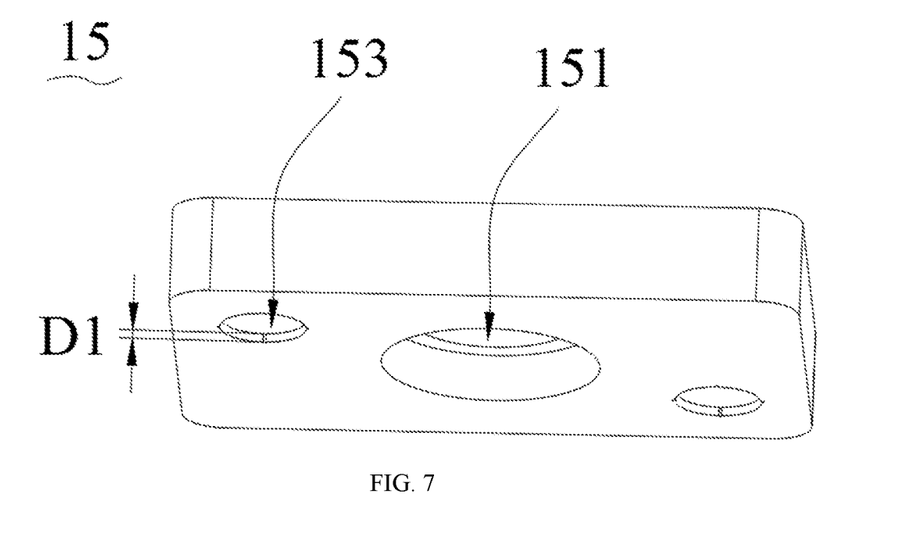
FIG. 7 is a schematic perspective structural view of a conductive block in an end cover assembly provided in embodiments of the present disclosure, viewed from another direction.
Figure 8:
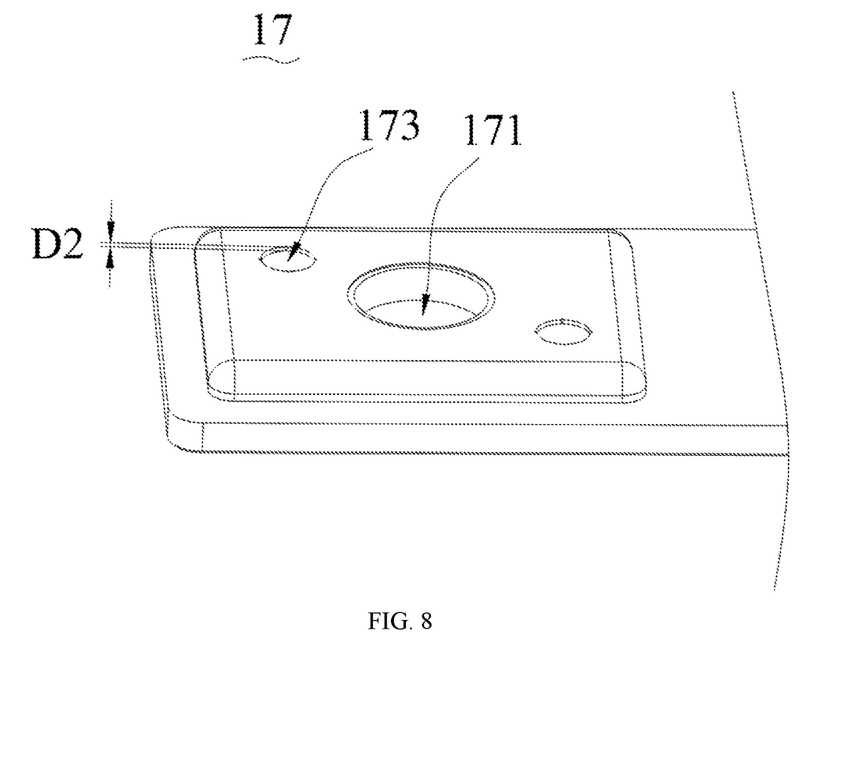
FIG. 8 is a schematic perspective structural view illustrating part of a top cover in an end cover assembly provided in embodiments of the present disclosure.

As illustrated in FIG. 5, FIG. 6, and FIG. 7, further, the height H1 at which the first protrusion portion 12 protrudes in the height direction from the main body 111 of the isolation member 11 satisfies: $0.42 \text{ mm} \leq H1 \leq 1.85 \text{ mm}$, and the height H2 at which the second protrusion portion 13 protrudes in the height direction from the main body 111 of the isolation member 11 satisfies: $0.42 \text{ mm} \leq H1 \leq 1.85 \text{ mm}$.

It can be seen that, the height H1 of the first protrusion portion 12 is greater than or equal to 0.42 mm and less than or equal to 1.85 mm, for example, the height H1 of the first protrusion portion 12 may be 0.68 mm, and the ratio of the height H1 of the first protrusion portion 12 to the depth D1 of the first blind hole 153 satisfies H1:D1=0.45-0.95. In this case, it can be ensured that the first protrusion portion 12 of the isolation member 11 can be fully inserted into the first blind hole 153, thereby ensuring that warping of the isolation member 11 can be avoided during assembling the isolation member 11 with the conductive block 15. In addition, it can be ensured that the height H1 of the first protrusion portion 12 is not too large and the depth D1 of the first blind hole 153 is also not too large, thereby shortening production time and reducing production cost. Furthermore, it can be ensured that the height H1 of the first protrusion portion 12 is not too small and the depth D1 of the first blind hole 153 is also not too small, thereby avoiding poor stability between the isolation member 11 and the conductive block 15 that are assembled together. The height H2 of the second protrusion portion 13 is greater than or equal to 0.42 mm and less than or equal to 1.85 mm, for example, the height H2 of the second protrusion portion 13 may be 0.68 mm, and the ratio of the height H2 of the second protrusion portion 13 to the depth D2 of the second blind hole 173 satisfies H2:D2=0.45-0.95. In this case, it can be ensured that the second protrusion portion 13 can be fully inserted into the second blind hole 173, thereby ensuring that warping of the isolation member 11 can be avoided during assembling the isolation member 11 with the top cover 17. In addition, it can be ensured that the height H2 of the second protrusion portion 13 is not too large and the depth D2 of the second blind hole 173 is also not too large, thereby shortening production time and reducing production cost. Furthermore, it can be ensured that the height H2 of the second protrusion portion 13 is not too small and the depth D2 of the corresponding second blind hole 173 is also not too small, thereby avoiding poor stability between the isolation member 11 and the top cover 17 that are assembled together. It may be understood that, in the case where the height H1 of the first protrusion portion 12 and the height H2 of the second protrusion portion 13 may both be greater than or equal to 0.42 mm and less than or equal to 1.85 mm, the ratio of the height H1 of the first protrusion portion 12 to the depth D1 of the first blind hole 153 satisfies H1:D1=0.45-0.95, and the ratio of the height H2 of the second protrusion portion 13 to the depth D2 of the second blind hole 173 satisfies H2:D2=0.45-0.95, the height H1 of the first protrusion portion 12 may be not equal to the height H2 of the second protrusion portion 13, correspondingly, the depth D1 of the first blind hole 153 may be not equal to the depth D2 of the second blind hole 173; or the height H1 of the first protrusion portion 12 may be equal to the height H2 of the second protrusion portion 13, correspondingly, the depth D1 of the first blind hole 153 may be equal to the depth D2 of the second blind hole 173.

As illustrated in FIG. 5 and FIG. 6, a distance H3 between a center of the first protrusion portion 12 and a center of the through hole 117 satisfies: 5.5 mm≤H3≤9.5 mm, and a distance H4 between a center of the second protrusion portion 13 and the center of the through hole 117 satisfies: 5.5 mm≤H4≤9.5 mm.

It can be seen that, the distance H3 between the center of the first protrusion portion 12 and the center of the through hole 117 is a distance between the center of the axis of the first protrusion portion 12 and the center of the axis of the through hole 117. The minimum value of the distance H3 between the center of the first protrusion portion 12 and the center of the through hole 117 is 5.5 mm to ensure a sufficient distance between the first protrusion portion 12 and the through hole 117. The maximum value of the distance H3 between the center of the first protrusion portion 12 and the center of the through hole 117 is 9.5 mm, so that the first protrusion portion 12 is not positioned beyond an edge of the isolation member 11, and thus torsion-withstanding achieved by fitting between the first protrusion portion 12 and the first blind hole 153 may not be weakened. The distance H4 between the center of the second protrusion portion 13 and the center of the through hole 117 is a distance between the center of the axis of the second protrusion portion 13 and the center of the axis of the through hole 117. The minimum value of the distance H4 between the center of the second protrusion portion 13 and the center of the through hole 117 is 5.5 mm to ensure a sufficient distance between the second protrusion portion 13 and the through hole 117. The maximum value of the distance H4 between the center of the second protrusion portion 13 and the center of the through hole 117 is 9.5 mm, so that the second protrusion portion 13 is not positioned beyond the edge of the isolation member 11, and thus torsion-withstanding achieved by fitting between the second protrusion portion 13 and the second blind hole 173 may not be weakened. In an embodiment, the distance H3 between the center of the first protrusion portion 12 and the center of the through hole 117 may be 7.74 mm to ensure a sufficient distance between the first protrusion portion 12 and the through hole 117, and thus interference of the first protrusion portion 12 to the through hole 117 may be avoided, and it may be ensured that the first protrusion portion 12 may not be positioned beyond the edge of the isolation member 11, thereby improving torsion-withstanding achieved by fitting between the first protrusion portion 12 and the first blind hole 153. The distance H4 between the center of the second protrusion portion 13 and the center of the through hole 117 may be 7.74 mm to ensure a sufficient distance between the second protrusion portion 13 and the through hole 117, and thus interference of the second protrusion portion 13 to the through hole 117 may be avoided, and it may be ensured that the second protrusion portion 13 may not be positioned beyond the edge of the isolation member 11, thereby improving torsion-withstanding achieved by fitting between the second protrusion portion 13 and the second blind hole 173. It may be understood that the distance H3 between the center of the first protrusion portion 12 and the center of the through hole 117 may be not equal to the distance H4 between the center of the second protrusion portion 13 and the center of the through hole 117, as long as the distance H3 satisfies 5.5 mm≤H3≤9.5 mm and the distance H4 satisfies 5.5 mm≤H4≤9.5 mm.

Figure 4:
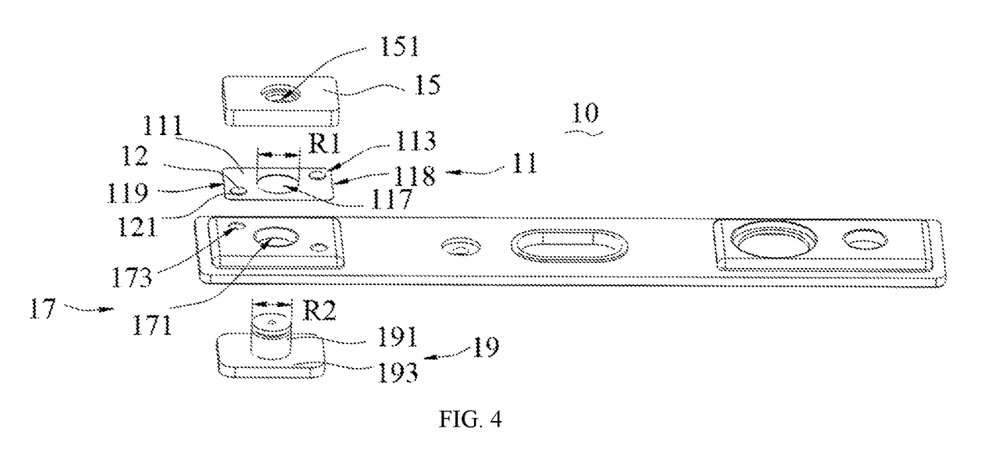
FIG. 4 is an exploded schematic perspective structural view of an end cover assembly provided in embodiments of the present disclosure.

As illustrated in FIG. 4 and FIG. 5, in a possible embodiment, a thickness H5 of the main body 111 of the isolation member 11 satisfies: 0.35 mm≤H5≤4.25 mm.

It can be seen that, the minimum value of the thickness H5 of the main body 111 of the isolation member 11 is 0.35 mm, so that the structural strength of the isolation member 11 may not be too low, and there may be a sufficient electrical isolation distance between the conductive block 15 and the top cover 17 to avoid creepage short circuit. The maximum value of the thickness H5 of the main body 111 of the isolation member 11 is 4.25 mm, so that the thickness H5 of the main body 111 of the isolation member 11 may not be too large, and the isolation member 11 that is relatively brittle is not prone to be crushed by the conductive block 15 during assembling the isolation member 11 with the conductive block 15. In an embodiment, the thickness H5 of the main body 111 of the isolation member 11 may be 0.7 mm. In this case, it can be ensured that the structural strength of the isolation member 11 may meet the requirement, and that there may be a sufficient electrical isolation distance between the conductive block 15 and the top cover 17 to avoid creepage short circuit, thereby ensuring safety usage of the energy-storage device 100.

As illustrated in FIG. 4, in a possible embodiment, a ratio of a diameter R1 of the through hole 117 to a diameter R2 of the post body 191 satisfies R1:R2=1.01-1.45.

It can be seen that, the minimum value of the ratio of the diameter R1 of the through hole 117 to the diameter R2 of the post body 191 is 1.01, so that it can be ensured that the post body 191 of the terminal post 19 may not be interfered by the isolation member 11 during assembly of the end cover assembly 10, and thus the precision requirement for assembly may be lowered. The maximum value of the ratio of the diameter R1 of the through hole 117 to the diameter R2 of the post body 191 is 1.45, so that the through hole 117 may not be too large, and thus the structural strength of the isolation member 11 may not be too low and accordingly torsion-withstanding of the end cover assembly 10 may not be weakened.

In a possible embodiment, positions of the multiple first protrusion portions 12 are all staggered from positions of the multiple second protrusion portion 13 on a plane perpendicular to the axis of the through hole 117.

It can be seen that, on the projection plane perpendicular to the axis of the through hole 117, the positions of the multiple first protrusion portions 12 on the first surface 113 are all staggered from the positions of the multiple second protrusion portion 13 on the second surface 115, so that the projection of each first protrusion portion 12 in the thickness direction of the isolation member 11 does not overlap the projection of any second protrusion portion 13 in the thickness direction of the isolation member 11. In this case, even if the first protrusion portion 12 cannot be fully inserted into the first blind hole 153 and the second protrusion portion 13 cannot be fully inserted into the second blind hole 173, in the thickness direction of the isolation member 11, a gap between the first protrusion portion 12 and a top wall of the first blind hole 153 is not aligned with a gap between the second protrusion portion 13 and a top wall of the second blind hole 173, and thus warping of the first protrusion portion 12 can be avoided in the case where the first protrusion portion 12 cannot be fully inserted into the first blind hole 153 and warping of the second protrusion portion 13 can be avoided in the case where the second protrusion portion 13 cannot be fully inserted into the second blind hole 173, and accordingly the precision requirement for assembling the first protrusion portion 12 into the first blind hole 153 and the precision requirement for assembling the second protrusion portion 13 into the second blind hole 173 may be lowered.

As illustrated in FIG. 4, FIG. 5, and FIG. 6, further, the main body 111 of the isolation member 11 may be rectangular. There may be two first protrusion portions 12, and the two first protrusion portions 12 are diagonally positioned on the first surface 113. There may be two second protrusion portions 13, and the two second protrusion portions 13 are diagonally positioned on the second surface 115.

It can be seen that, the main body 111 of the isolation member 11 is rectangular, the two first protrusion portions 12 on the first surface 113 are positioned on one diagonal of the isolation member 11, the two second protrusion portions 13 on the second surface 115 are positioned on another diagonal of the isolation member 11, and on the projection plane perpendicular to the axis of the through hole 117, the two first protrusion portions 12 and the two second protrusion portions 13 are evenly distributed around the through hole 117. In this case, the isolation member 11 may be subject to uniform force to avoid rotation, thereby improving torsion-withstanding of the isolation member 11. In addition, the two first protrusion portions 12 are positioned on one diagonal of the isolation member 11, and the two second protrusion portions 13 are positioned on another diagonal of the isolation member 11, so that the two first protrusion portions 12 and the two second protrusion portions 13 can be positioned as far away as possible from the through hole 117. In this way, during riveting the conductive block 15, the top cover 17, and the terminal post 19 together, in the case where the isolation member 11 is pressed by the conductive block 15 and slightly deforms, the first protrusion portion 12 and the second protrusion portion 13 may not be damaged, and thus rotation of the isolation member 11 can be avoided, and further the first protrusion portion 12 and the second protrusion portion may not interfere the through hole 117.

Further, the isolation member 11 is a resistive member made of conductive plastic. It can be seen that, the isolation member 11 made of conductive plastic has low production cost, high strength, and relatively good toughness, so that the isolation member 11 can withstand large torque impact without being broken. In addition, with aid of the isolation member 11, a weakly conductive connection (where a resistivity ranges from $10^3$ ohms ($\Omega$)/square (sq) to $10^{10}$ ($\Omega$/sq) may be formed between the top cover 17 and the conductive block 15 to make the housing 30 and a positive electrode of the energy-storage device 100 be at the same potential, so that electrochemical corrosion of the housing 30 of the energy-storage device 100 can be avoided, and accordingly the service life of the energy-storage device 100 can be prolonged.

Further, the isolation member 11 has a resistivity ranging from $10^3$ $\Omega$/sq to $10^{10}$ $\Omega$/sq. It can be seen that, in the case where the resistivity of the isolation member 11 ranges from $10^3$ ($\Omega$/sq to $10^{10}$ $\Omega$/sq, the housing 30 and the positive electrode of the energy-storage device 100 may be at the same potential, and thus electrochemical corrosion of the housing 30 of the energy-storage device 100 can be avoided, and accordingly the service life of the energy-storage device 100 can be prolonged.

Further, each of the multiple first protrusion portions 12 is cylindrical, and each of the multiple second protrusion portions 13 is cylindrical. The first elongated protrusion 121 extends, along an axis of the first protrusion portion 12, from the first surface 113 to the position of the first protrusion portion 12 that is below a surface of the first protrusion portion 12 away from the first surface 113, and the end of the first elongated protrusion 121 below the surface of the first protrusion portion 12 away from the first surface 113 is a chamfered end. The second elongated protrusion 131 extends, along an axis of the second protrusion portion 13, from the second surface 115 to the position of the second protrusion portion 13 that is below a surface of the second protrusion portion 13 away from the second surface 115, and has a chamfered end close to the surface of the second protrusion portion 13 away from the second surface 115.

It can be seen that, the first elongated protrusion 121 extends, along the axis of the first protrusion portion 12, from the first surface 113 to the position of the first protrusion portion 12 that is below the surface of the first protrusion portion 12 away from the first surface 113, and has a chamfered end close to the surface of the first protrusion portion 12 away from the first surface 113. During inserting the first protrusion portion 12 into the first blind hole 153, with aid of the chamfered end of the first elongated protrusion 121, it can be guided to insert the first protrusion portion 12 by abutting an inclined surface of the chamfered end against the sidewall of the first blind hole 153. In this case, the first protrusion portion 12 can be inserted into the first blind hole 153 smoothly, the guiding effect of the first elongated protrusion 121 may be further strengthened, and the first protrusion portion 12 can be accurately inserted into the first blind hole 153 to fit the first protrusion portion 12 with the first blind hole 153, thereby improving the efficiency of assembling the conductive block 15 with the isolation member 11. Similarly, the second elongated protrusion 131 extends, along the axis of the second protrusion portion 13, from the second surface 115 to the position of the second protrusion portion 13 that is below the surface of the second protrusion portion 13 away from the second surface 115, and has a chamfered end (which has the same structure as the chamfered end of the first protrusion portion 12) close to the surface of the second protrusion portion 13 away from the second surface 115. During inserting the second protrusion portion 13 into the second blind hole 173, with aid of the chamfered end of the second elongated protrusion 131, it can be guided to insert the second protrusion portion 13 by abutting an inclined surface of the chamfered end against the sidewall of the second blind hole 173. In this case, the second protrusion portion 13 can be inserted into the second blind hole 173 smoothly, the guiding effect of the second elongated protrusion 131 may be further strengthened, and the second protrusion portion 13 can be accurately inserted into the second blind hole 173 to fit the first protrusion portion 12 with the first blind hole 153, thereby improving the efficiency of assembling the top cover 17 with the isolation member 11. It may be understood that the structure of the first elongated protrusion 121 may be the same as the structure of the second elongated protrusion 131.

As illustrated in FIG. 5 and FIG. 6, there may be multiple first elongated protrusions 121 and multiple second elongated protrusions 131. The multiple first elongated protrusions 121 may be evenly spaced apart from each other on the outer peripheral wall of the first protrusion portion 12 in a circumferential direction of the first protrusion portion 12, and the multiple second elongated protrusions 131 may be evenly spaced apart from each other on the outer peripheral wall of the second protrusion portion 13 in a circumferential direction of the second protrusion portion 13.

It can be seen that, the multiple first elongated protrusions 121 are positioned on the outer peripheral wall of the first protrusion portion 12, and the conductive block 15 may be assembled with the isolation member 11 under the guidance of the multiple first elongated protrusions 121, and thus the guiding effect of the multiple first elongated protrusions 121 may be further strengthened. In addition, the energy-storage device 100 may be subject to impact during assembly or use, and the conductive block 15 may be subject to a torsion force in a radial direction perpendicular to the axis of the terminal post 19. In this case, the first elongated protrusion 121 may serve as a sacrifice body for first buffering of impact, and thus breakage of the first protrusion portion 12 and rotation of the isolation member 11 can be avoided, thereby further improving the safety performance of the energy-storage device 100 and prolonging the service life of the energy-storage device 100. Similarly, the multiple second elongated protrusions 131 are positioned on the outer peripheral wall of the second protrusion portion 13, and the top cover 17 may be assembled with the isolation member 11 under the guidance of the multiple second elongated protrusions 131, and thus the guiding effect of the multiple second elongated protrusions 131 may be further strengthened. In addition, the energy-storage device 100 may be subject to impact during assembly or use, and the top cover 17 may be subject to a torsion force in a radial direction perpendicular to the axis of the terminal post 19. In this case, the second elongated protrusion 131 may serve as a sacrifice body for first buffering of impact, and thus breakage of the second protrusion portion 13 and rotation of the isolation member 11 can be avoided, thereby further improving the safety performance of the energy-storage device 100 and prolonging service life of the energy-storage device 100. In an embodiment, there may be four first elongated protrusions 121 and four second elongated protrusions 131. Each two adjacent first elongated protrusions 121 are positioned with a right angle defined therebetween in a circumferential direction of the outer peripheral wall of the first protrusion portion 12. Each two adjacent second elongated protrusions 131 are positioned with a right angle defined therebetween in a circumferential direction of the outer peripheral wall of the second protrusion portion 13.

In addition, as illustrated in FIG. 5, the main body 111 of the isolation member 11 may be rectangular. The main body 111 of the isolation member 11 may define a first notch 118 at one of two opposite sides of the main body 111 in a length direction of the main body 111 and a second notch 119 at the other of the two opposite sides of the main body 111 in the length direction of the main body 111.

It can be seen that, during pressing of the conductive block 15, with aid of the first notch 118 and the second notch 119 respectively defined at the two opposite sides of the isolation member 11 in the length direction of the isolation member 1, torsion stress on the isolation member 11 caused by dislocation of the first protrusion portion 12 can be released to avoid facture of the isolation member 11. Parts of the isolation member 11 at the first notch 118 and the second notch 119 may be prone to breakage, and thus in the case where the isolation member 11 is broken, it can be ensured that the first protrusion portion 12 may be still in the first blind hole 153 on the conductive block 15 and that the second protrusion portion 13 may be still in the second blind hole 173 on the top cover 17, thereby avoiding displacement of the isolation member 11.

In a possible embodiment, a width D3 of the first notch 118 in a width direction of the main body 111 of the isolation member 11 satisfies: 3 mm≤D3≤8 mm.

It can be seen that, the minimum value of the width D3 of the first notch 118 in the width direction of the main body 111 of the isolation member 11 is 3 mm. In this case, the width D3 of the first notch 118 may not be too small, and thus it can be ensured that during pressing of the conductive block 15, with aid of the first notch 118, torsion stress on the isolation member 11 caused by dislocation of the first protrusion portion 12 and dislocation of the second protrusion portion 13 can be released to avoid fracture of the isolation member 11. In addition, in the case where the width D3 of the first notch 118 is less than 3 mm, part of the isolation member 11 at the first notch 118 may not be prone to breakage, and thus when torsion stress on the isolation member 11 is too large, the main body 111 of the isolation member 11 may be broken directly, the first protrusion portion 12 may be disengaged from the first blind hole 153 on the conductive block 15, and the second protrusion portion 13 may be disengaged from the second blind hole 173 on the top cover 17, resulting in displacement of the isolation member 11. The maximum value of the width D3 of the first notch 118 is 8 mm, so that the width D3 of the first notch 118 may not be too large, and thus arrangement of both the first protrusion portion 12 and the second protrusion portion 13 may not be affected, and the structure strength of both the first protrusion portion 12 and the second protrusion portion 13 may not be reduced. In an embodiment, the width D3 of the first notch 118 may be 5 mm. In this case, the width D3 of the first notch 118 is within a suitable range, and thus during pressing of the conductive block 15, with aid of the first notch 118, torsion stress on the isolation member 11 caused by dislocation of the first protrusion portion 12 and dislocation of the second protrusion portion 13 can be released to avoid fracture of the isolation member 11. In addition, part of the isolation member 11 at the first notch 118 is prone to breakage, and thus in the case where the isolation member 11 is broken, it can be ensured that the first protrusion portion 12 may be still in the first blind hole 153 on the conductive block 15 and that the second protrusion portion 13 may be still in the second blind hole 173 on the top cover 17, avoiding displacement of the isolation member 11.

In a possible embodiment, a width D4 of the second notch 119 in the width direction of the main body 111 of the isolation member 11 is less than the width D3, and the width D4 of the second notch 119 in the width direction of the main body 111 of the isolation member 11 satisfies: 1.5 mm≤D4≤5.5 mm.

It can be seen that, the width D4 of the second notch 119 in the width direction of the main body 111 of the isolation member 11 is less than the width D3 of the first notch 118, and the second notch 119 is further away from an explosion-proof valve in the end cover assembly 10 than the first notch 118 after the end cover assembly 10 is assembled. In this case, when pressure inside the energy-storage device 100 is too high, the pressure can be partially released through the second notch 119 to ensure the usage safety of the energy-storage device 100. Similarly, the minimum value of the width D4 of the second notch 119 in the width direction of the main body 111 of the isolation member 11 is 1.5 mm. In this case, the width D4 of the second notch 119 may not be too small, and thus it can be ensured that during pressing of the conductive block 15, with aid of the second notch 119, torsion stress on the isolation member 11 caused by dislocation of the first protrusion portion 12 and dislocation of the second protrusion portion 13 can be released to avoid fracture of the isolation member 11. In addition, in the case where the width D4 of the second notch 119 is less than 1.5 mm, part of the isolation member 11 at the second notch 119 may not be prone to breakage, and thus when torsion stress on the isolation member 11 is too large, the main body 111 of the isolation member 11 may be broken directly, the first protrusion portion 12 may be disengaged from the first blind hole 153 on the conductive block 15, and the second protrusion portion 13 may be disengaged from the second blind hole 173 on the top cover 17, resulting in displacement of the isolation member 11. The maximum value of the width D4 of the second notch 119 is 5.5 mm. In this case, the width D4 of the second notch 119 may not be too large, and thus arrangement of both the first protrusion portion 12 and the second protrusion portion 13 may not be affected, and the structure strength of both the first protrusion portion 12 the second protrusion portion 13 may not be reduced. In an embodiment, the width D4 of the second notch 119 may be 3.5 mm. In this case, the width D4 of the second notch 119 is within a suitable range, and thus during pressing of the conductive block 15, with aid of the second notch 119, torsion stress on the isolation member 11 caused by dislocation of the first protrusion portion 12 and dislocation of the second protrusion portion 13 can be released to avoid fracture of the isolation member 11. In addition, part of the isolation member 11 at the second notch 119 is prone to breakage, and thus in the case where the isolation member 11 is broken, it can be ensured that the first protrusion portion 12 may be still in the first blind hole 153 on the conductive block 15 and that the second protrusion portion 13 may be still in the second blind hole 173 on the top cover 17, thereby avoiding displacement of the isolation member 11.

As illustrated in FIG. 4, in a possible embodiment, the terminal post 19 may further include a flange portion 193, and the post body 191 may be positioned on the flange portion 193. The post body 191 passes through the mounting hole 171, the through hole 117, and the assembly hole 151 sequentially, and is fixedly connected to a surface of the conductive block 15 away from the first surface 113. The flange portion 193 abuts against a side of the top cover 17 away from the isolation member 11.

An electricity-consumption device is further provided in embodiments of the present disclosure. The electricity-consumption device includes the energy-storage device 100 provided in any of the above embodiments, and the energy-storage device 100 is configured to power the electricity-consumption device. Technical solutions of the embodiments of the present disclosure are all applicable to various electricity-consumption devices with the energy-storage device 100, for example, an electromobile, an electric toy, an electric tool, an electric vehicle, a ship and a spacecraft, a mobile phone, a portable device, a personal digital assistant (PDA), a notebook computer, or the like.

In the electricity-consumption device in the present disclosure, the isolation member 11 is provided with the multiple first protrusion portions 12 on the first surface 113 of the isolation member 11, each first protrusion portion 12 is provided with at least one first elongated protrusion 121 on the outer peripheral wall of the first protrusion portion 12, the conductive block 15 defines the multiple first blind holes 153 on the surface of the conductive block 15 facing the first surface 113, and each first blind hole 153 corresponds to and fits one first protrusion portion 12. During assembling the isolation member 11 with the conductive block 15, with aid of the guidance of the first elongated protrusion 121 on the outer peripheral wall of the first protrusion portion 12, it may be easy to align the first protrusion portion 12 with and insert the first protrusion portion 12 into a corresponding first blind hole 153 on the conductive block 15, thereby improving the efficiency of assembling the isolation member 11 with the conductive block 15. Each first blind hole 153 fits one first protrusion portion 12, and the first elongated protrusion 121 on the outer peripheral wall of each first protrusion portion 12 can efficiently prevent rotation of the isolation member 11 relative to the conductive block 15. The isolation member 11 is provided with multiple second protrusion portion 13 on the second surface 13 of the isolation member 11, and each second protrusion portion 13 is provided with at least one second elongated protrusion 131 on the outer peripheral wall of each second protrusion portion 13. The top cover 17 defines the multiple second blind holes 173 on the surface of the top cover 17 facing the second surface 115, and each second blind hole 173 corresponds to and fits one second protrusion portion 13. During assembling the isolation member 11 with the top cover 17, with aid of guidance of the second elongated protrusion 131 on the outer peripheral wall of the second protrusion portion 13, it may be easy to align the second protrusion portion 13 with and insert the second protrusion portion 13 into the second blind hole 173, thereby improving the efficiency of assembling the isolation member 11 with the top cover 17. Each second blind hole 173 fits one second protrusion portion 13, and the second elongated protrusion 131 on the outer peripheral wall of the second protrusion portion 13 can efficiently prevent rotation of the isolation member 11 relative to the top cover 17. The isolation member 11 is sandwiched between the top cover 17 and the conductive block 15, each first protrusion portion 12 on the first surface 113 fits one first blind hole 153 on the conductive block 15 to limit the position of the first protrusion portion 12, and each second protrusion portion 13 on the second surface 115 fits one second blind hole 173 on the top cover 17 to limit the position of the second protrusion portion 13. In this way, the isolation member 11 can be positioned to avoid dislocation, and rotation of the conductive block 15 relative to the top cover 17 can be avoided, such that torsion-withstanding of the energy-storage device 100 can be improved, and the energy-storage device 100 can be protected from damage during subsequent module assembly of the energy-storage device 100.

The above merely illustrates some embodiments of the present disclosure. It may be pointed out that for those skilled in the art, various improvements and modification can be made without departing from the principle of the present disclosure, and these improvements and modification made within the spirit of the present disclosure shall fall in the scope of protection of the present disclosure.

What is claimed is:

1. An end cover assembly, applicable to an energy-storage device and comprising:
   an isolation member, wherein a main body of the isolation member has a first surface and a second surface opposite the first surface, and the isolation member defines a through hole penetrating through both the first surface and the second surface;
   a plurality of first protrusion portions positioned on the first surface, wherein each of the plurality of first protrusion portions: is spaced apart from the through hole, is provided with at least one first elongated protrusion on an outer peripheral wall of the first protrusion portion, and is cylindrical, and the at least one first elongated protrusion extends, along an axis of the first protrusion portion, from the first surface to a position of the first protrusion portion that is below a surface of the first protrusion portion away from the first surface, and has a chamfered end close to the surface of the first protrusion portion away from the first surface;
   a plurality of second protrusion portions positioned on the second surface, wherein each of the plurality of second protrusion portions: is spaced apart from the through hole, is provided with at least one second elongated protrusion on an outer peripheral wall of the second protrusion portion, and is cylindrical, and the at least one second elongated protrusion extends, along an axis of the second protrusion portion, from the second surface to a position of the second protrusion portion that is below a surface of the second protrusion portion away from the second surface, and has a chamfered end close to the surface of the second protrusion portion away from the second surface;
   a conductive block defining a plurality of first blind holes on a surface of the conductive block close to the first surface and defining an assembly hole, wherein each of the plurality of first blind holes fits one of the plurality of first protrusion portions, and each of the plurality of first protrusion portions is inserted into one of the plurality of first blind holes;
   a top cover defining a plurality of second blind holes on a surface of the top cover close to the second surface and defining a mounting hole, wherein each of the plurality of second blind holes fits one of the plurality of second protrusion portions, and each of the plurality of second protrusion portions is inserted into one of the plurality of second blind holes; and
   a terminal post comprising a post body, wherein the post body passes through the mounting hole, the through hole, and the assembly hole sequentially, and is fixedly connected to a surface of the conductive block away from the first surface;
   wherein positions of the plurality of first protrusion portions are all staggered from positions of the plurality of second protrusion portions on a plane perpendicular to an axis of the through hole.

2. The end cover assembly of claim 1, wherein a ratio of a height H1 at which the first protrusion portion protrudes in a height direction from the main body of the isolation member to a depth D1 of the first blind hole satisfies H1:D1=0.45-0.95, and a ratio of a height H2 at which the second protrusion portion protrudes in the height direction from the main body of the isolation member to a depth D2 of the second blind hole satisfies H2:D2=0.45-0.95.

3. The end cover assembly of claim 2, wherein the height H1 at which the first protrusion portion protrudes in the height direction from the main body of the isolation member satisfies: 0.42 mm≤H1≤1.85 mm, and the height H2 at which the second protrusion portion protrudes in the height direction from the main body of the isolation member satisfies: 0.42 mm≤H2≤1.85 mm.

4. The end cover assembly of claim 1, wherein a distance H3 between a center of the first protrusion portion and a center of the through hole satisfies: 5.5 mm≤H3≤9.5 mm, and a distance H4 between a center of the second protrusion portion and the center of the through hole satisfies: 5.5 mm≤H4≤9.5 mm.

5. The end cover assembly of claim 1, wherein a thickness H5 of the main body of the isolation member satisfies: 0.35 mm≤H5≤4.25 mm.

6. The end cover assembly of claim 1, wherein a ratio of a diameter R1 of the through hole to a diameter R2 of the post body satisfies R1:R2=1.01-1.45.

7. The end cover assembly of claim 1, wherein the at least one first elongated protrusion is implemented as a plurality of first elongated protrusions, and the at least one second elongated protrusion is implemented as a plurality of second elongated protrusions; and the plurality of first elongated protrusions are evenly spaced apart from each other on the outer peripheral wall of the first protrusion portion in a circumferential direction of the first protrusion portion, and the plurality of second elongated protrusions are evenly spaced apart from each other on the outer peripheral wall of the second protrusion portion in a circumferential direction of the second protrusion portion.

8. The end cover assembly of claim 1, wherein the main body of the isolation member is rectangular; the plurality of first protrusion portions are implemented as two first protrusion portions, and the two first protrusion portions are diagonally positioned on the first surface; and the plurality of second protrusion portions are implemented as two second protrusion portions, and the two second protrusion portions are diagonally positioned on the second surface.

9. The end cover assembly of claim 1, wherein the main body of the isolation member is rectangular, and defines a first notch at one of two opposite sides of the main body in a length direction of the main body and a second notch at the other of the two opposite sides of the main body in the length direction of the main body.

10. The end cover assembly of claim 9, wherein a width D3 of the first notch (118) in a width direction of the main body of the isolation member satisfies: 3 mm≤D3≤8 mm.

11. The end cover assembly of claim 10, wherein a width D4 of the second notch in the width direction of the main body of the isolation member is less than the width D3, and the width D4 of the second notch in the width direction of the main body of the isolation member satisfies: 1.5 mm≤D4≤5.5 mm.

12. The end cover assembly of claim 1, wherein the isolation member is a resistive member made of conductive plastic.

13. The end cover assembly of claim 12, wherein the isolation member has a resistivity ranging from 10^3 ohms (Ω)/square (sq) to 10^10 Ω/sq.

14. An energy-storage device comprising:
a housing; and
an end cover assembly mounted at a top side of the housing and comprising:
an isolation member, wherein a main body of the isolation member has a first surface and a second surface opposite the first surface, and the isolation member defines a through hole penetrating through both the first surface and the second surface;
a plurality of first protrusion portions positioned on the first surface, wherein each of the plurality of first protrusion portions: is spaced apart from the through hole, is provided with at least one first elongated protrusion on an outer peripheral wall of the first protrusion portions, and is cylindrical, and the at least one first elongated protrusion extends, along an axis of the first protrusion portion, from the first surface to a position of the first protrusion portion that is below a surface of the first protrusion portion away from the first surface, and has a chamfered end close to the surface of the first protrusion portion away from the first surface;
a plurality of second protrusion portions positioned on the second surface, wherein each of the plurality of second protrusion portions: is spaced apart from the through hole, is provided with at least one second elongated protrusion on an outer peripheral wall of the second protrusion portion, and is cylindrical, and the at least one second elongated protrusion extends, along an axis of the second protrusion portion, from the second surface to a position of the second protrusion portion that is below a surface of the second protrusion portion away from the second surface, and has a chamfered end close to the surface of the second protrusion portion away from the second surface;
a conductive block defining a plurality of first blind holes on a surface of the conductive block close to the first surface and defining an assembly hole, wherein each of the plurality of first blind holes fits one of the plurality of first protrusion portions, and each of the plurality of first protrusion portions is inserted into one of the plurality of first blind holes;
a top cover defining a plurality of second blind holes on a surface of the top cover close to the second surface and defining a mounting hole, wherein each of the plurality of second blind holes fits one of the plurality of second protrusion portions, and each of the plurality of second protrusion portions is inserted into one of the plurality of second blind holes; and
a terminal post comprising a post body, wherein the post body passes through the mounting hole, the through hole, and the assembly hole sequentially, and is fixedly connected to a surface of the conductive block away from the first surface;
wherein positions of the plurality of first protrusion portions are all staggered from positions of the plurality of second protrusion portions on a plane perpendicular to an axis of the through hole.

15. The energy-storage device of claim 14, wherein a ratio of a height H1 at which the first protrusion portion protrudes in a height direction from the main body of the isolation member to a depth D1 of the first blind hole satisfies H1:D1=0.45-0.95, and a ratio of a height H2 at which the second protrusion portion protrudes in the height direction from the main body of the isolation member to a depth D2 of the second blind hole satisfies H2:D2=0.45-0.95.

16. The energy-storage device of claim 15, wherein the height H1 at which the first protrusion portion protrudes in the height direction from the main body of the isolation member satisfies: 0.42 mm≤H1≤1.85 mm, and the height H2 at which the second protrusion portion protrudes in the height direction from the main body of the isolation member satisfies: 0.42 mm≤H2≤1.85 mm.

17. The energy-storage device of claim 14, wherein a distance H3 between a center of the first protrusion portion and a center of the through hole satisfies: 5.5 mm≤H3≤9.5 mm, and a distance H4 between a center of the second protrusion portion and the center of the through hole satisfies: 5.5 mm≤H4≤9.5 mm.

18. The energy-storage device of claim 14, wherein a thickness H5 of the main body of the isolation member satisfies: 0.35 mm≤H5≤4.25 mm.

19. An electricity-consumption device comprising:
an energy-storage device configured to power the electricity-consumption device and comprising:
a housing; and
an end cover assembly mounted at a top side of the housing and comprising:
an isolation member, wherein a main body of the isolation member has a first surface and a second surface opposite the first surface, and the isolation member defines a through hole penetrating through both the first surface and the second surface;
a plurality of first protrusion portions positioned on the first surface, wherein each of the plurality of first protrusion portions: is spaced apart from the through hole, is provided with at least one first elongated protrusion on an outer peripheral wall of the first protrusion portion, and is cylindrical, and the at least one first elongated protrusion extends, along an axis of the first protrusion portion, from the first surface to a position of the first protrusion portion that is below a surface of the first protrusion portion away from the first surface, and has a chamfered end close to the surface of the first protrusion portion away from the first surface;
a plurality of second protrusion portions positioned on the second surface, wherein each of the plurality of second protrusion portions is spaced apart from the through hole, is provided with at least one second elongated protrusion on an outer peripheral wall of the second protrusion portion, and is cylindrical, and the at least one second elongated protrusion extends, along an axis of the second protrusion portion, from the second surface to a position of the second protrusion portion that is below a surface of the second protrusion portion away from the second surface, and has a chamfered end close to the surface of the second protrusion portion away from the second surface;
a conductive block defining a plurality of first blind holes on a surface of the conductive block close to the first surface and defining an assembly hole, wherein each of the plurality of first blind holes fits one of the plurality of first protrusion portions, and each of the plurality of first protrusion portions is inserted into one of the plurality of first blind holes;
a top cover defining a plurality of second blind holes on a surface of the top cover close to the second surface and defining a mounting hole, wherein each of the plurality of second blind holes fits one of the plurality of second protrusion portions, and each of the plurality of second protrusion portions is inserted into one of the plurality of second blind holes; and
a terminal post comprising a post body, wherein the post body passes through the mounting hole, the through hole, and the assembly hole sequentially, and is fixedly connected to a surface of the conductive block away from the first surface;
wherein positions of the plurality of first protrusion portions are all staggered from positions of the plurality of second protrusion portions on a plane perpendicular to an axis of the through hole.

\* \* \* \* \*